Nov. 11, 1958 G. H. ROESCH 2,859,935
COOLING OF TURBINES
Filed Feb. 14, 1952 5 Sheets-Sheet 5

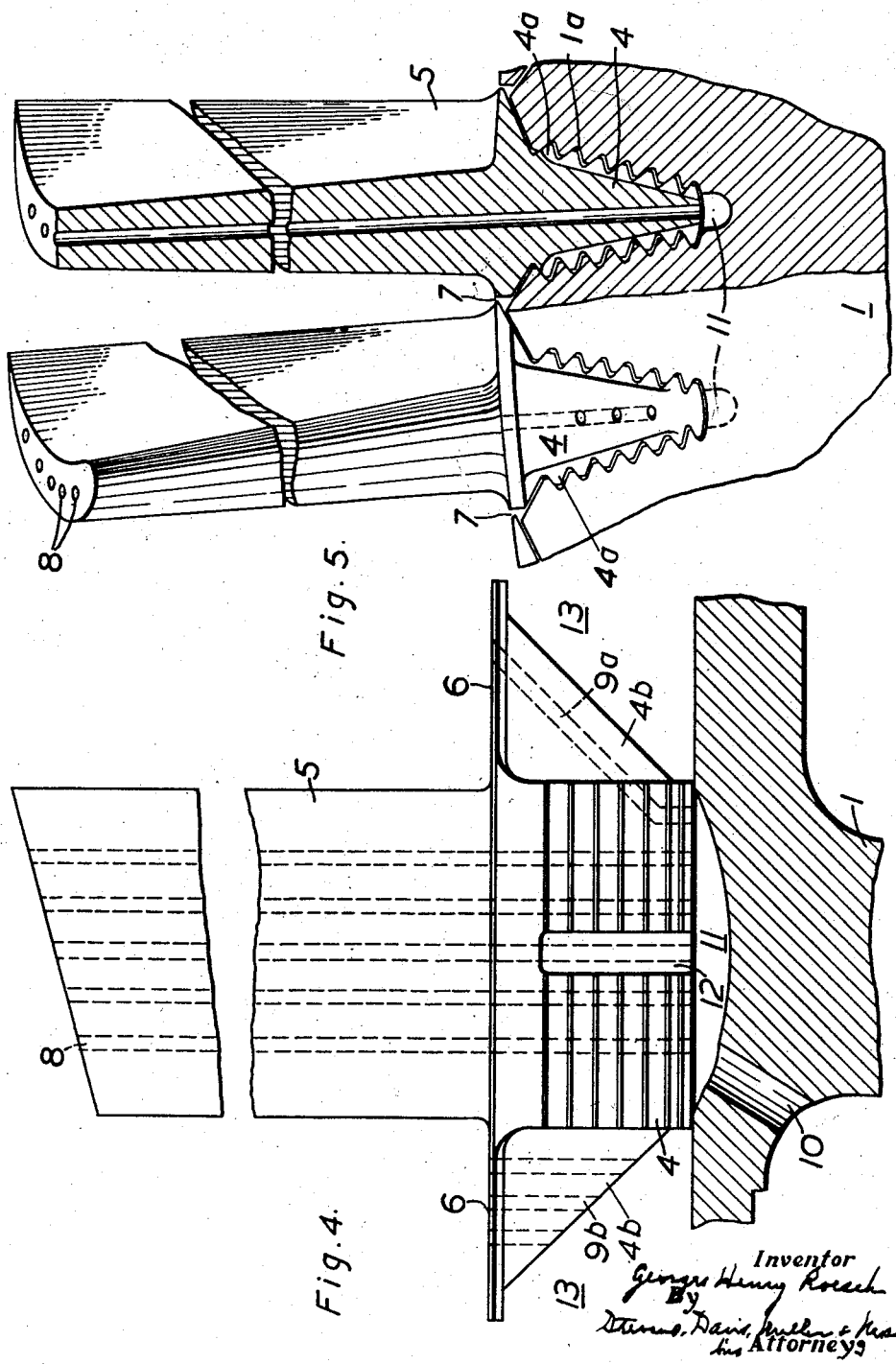

United States Patent Office 2,859,935
Patented Nov. 11, 1958

2,859,935

COOLING OF TURBINES

Georges Henry Roesch, London, England, assignor to Power Jets (Research and Development) Limited, London, England, a company of Great Britain Application February 14, 1952, Serial No. 271,601

Claims priority, application Great Britain February 15, 1951

8 Claims. (Cl. 253—39.15)

As the temperature of working fluid for which a gas turbine is designed increases, more effective cooling and insulation must be provided so as to maintain satisfactory running clearances between stator and rotor parts. This invention is directed generally to this problem.

Thus in an axial-flow turbine important running clearances are between the tips of the rotor blades and a stator shroud ring enveloping them and between the tips of the stator blades and a shroud ring around the rotor. A shroud formed as a complete ring must expand in proportion to its diameter; but in a shroud formed of platforms integral with and projecting—axially of the turbine—from individual blades, small clearances between the platforms permit thermal expansion without restraint or appreciable change of ring diameter. According to a feature of the invention the blades have platforms forming a shroud as aforesaid and are cooled by coolant flowing over the exterior of the roots and seatings and preferably also through ducts along the blades. According to another feature the platforms are immediately above the roots and some of the coolant flows to narrow annular gaps between shrouds and stator or rotor body. According to further features, the coolant is led to the blades through heat-insulated paths within the turbine, and furthermore the coolant is led to separate parts of the rotor, in particular to the different stages of a multi-stage turbine, in separate streams, which allows the rate of supply of coolant to each stage to be separately adjusted to the needs of that stage.

Figure 1:
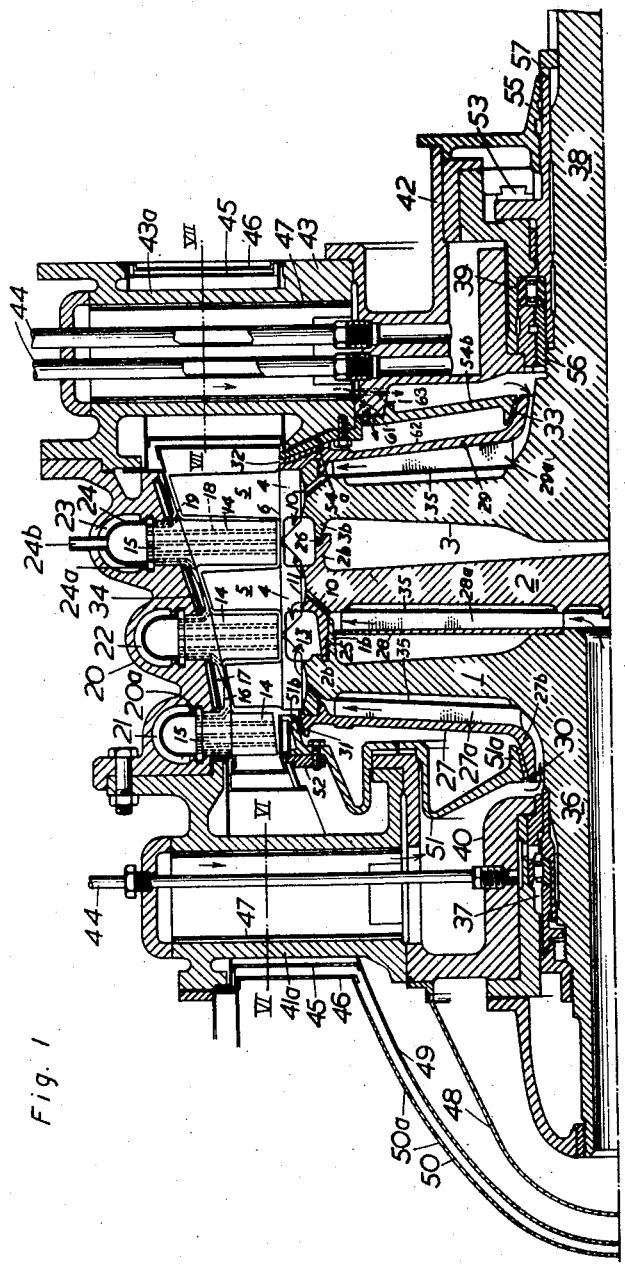
Figure 2:
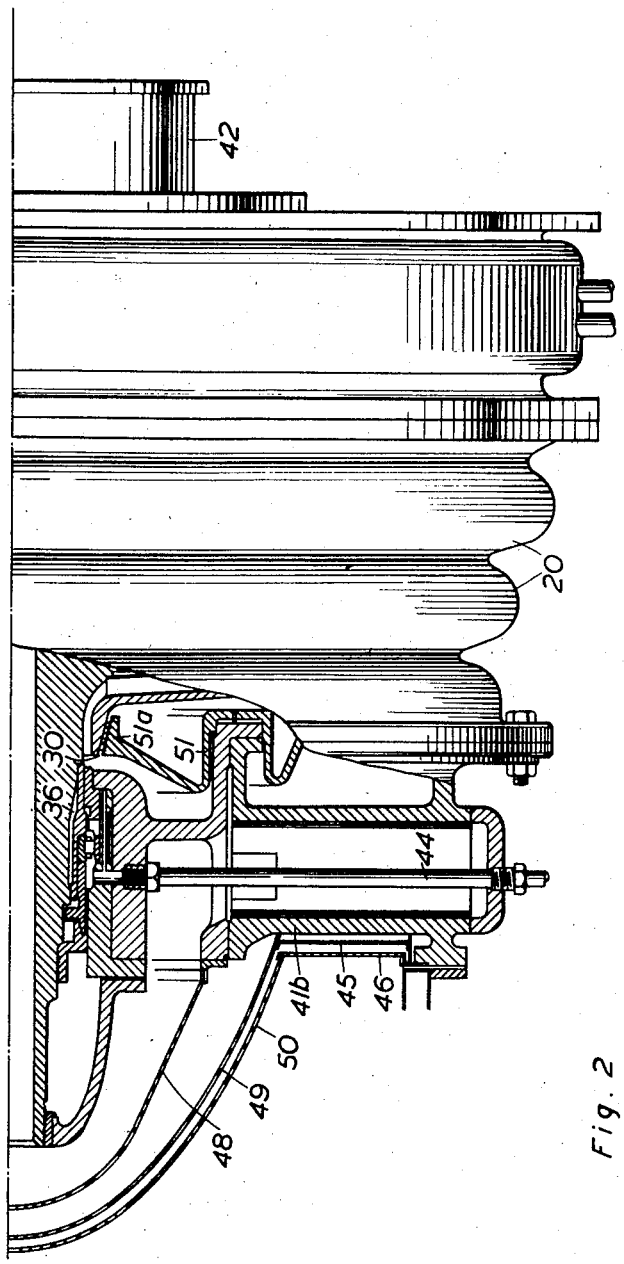
Figure 3:
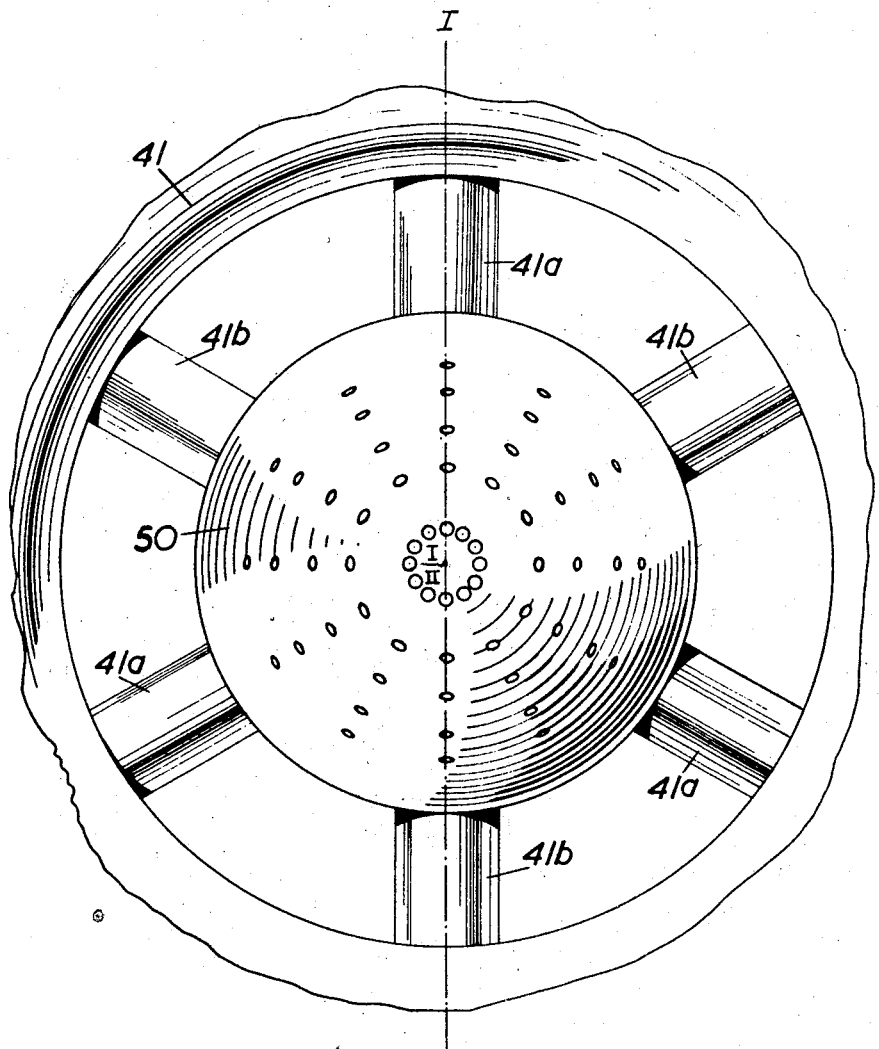
Figure 6:
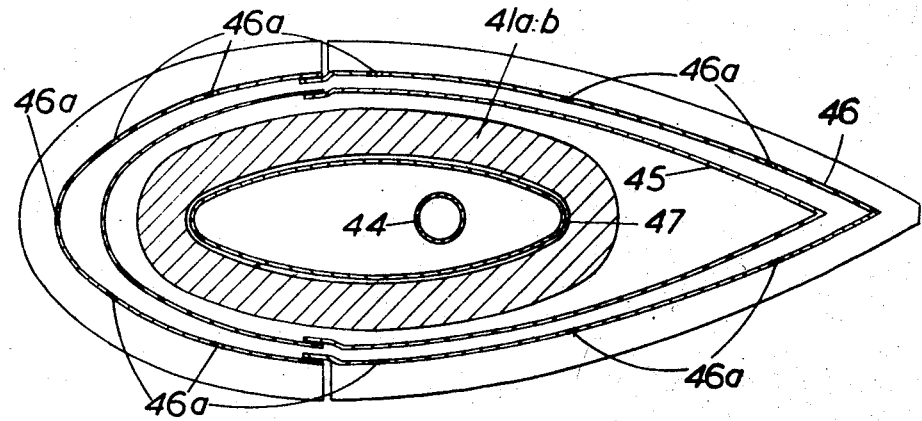
Figure 7:
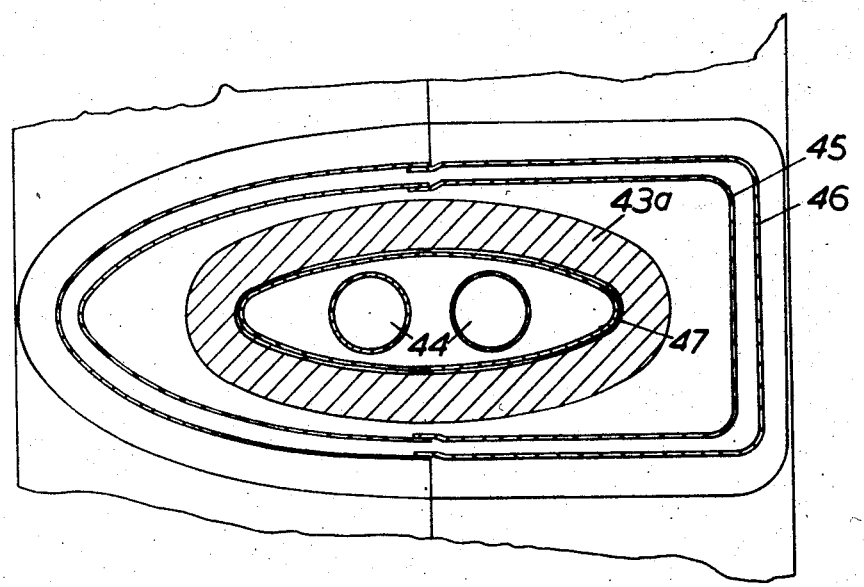

One particular construction of three-stage axial-flow turbine incorporating the invention is shown in the accompanying drawings, of which Figure 1 is a longitudinal section through the upper half and Figure 2 is a view, partly in longitudinal section, of the lower half of the complete turbine, Figure 3 is a part view of the turbine from one end, Figures 4 and 5 are detail views of the rotor blades and Figures 6 and 7 are sectional views through VI—VI and VII—VII of Figure 1 showing heat-insulated paths for cooling air.

As shown in Figure 1, the turbine rotor body is built up of a number of flanged disc wheels 1, 2, 3, each having its circumferential flange at less radius than the periphery of the rim. The flanges of adjacent discs meet to form the annular outer surface of the rotor body; flanges 1b and 2b of discs 1 and 2 are shown coupled by the screwed joint 25 while flanges 2b and 3b are shown overlapping and fastened together by the welded joint 26. Annular spaces are thus enclosed between the discs.

Each rim has grooves across it to form seatings 1a, 2a and 3a for the roots of a ring of turbine rotor blades 5 shown in more detail in the enlarged view Figure 4 of a blade and the corresponding view Figure 5 partly in radial section through the rim. Each blade 5 has a tapered root 4 with ribs 4a (such as a so-called "fir tree" root) integral with a platform 6 immediately above it extending axially and circumferentially, a small gap 7 being left between the edges of adjacent platforms 6 to allow for thermal expansion under operating conditions while at the same time the platforms are sufficiently close together as in effect to form an annular shroud around the flanges 1b, 2b and 3b. The ribs 4a fit tightly in complementary grooves forming the seating 1a in disc 1. Inclined stiffening webs 4b may extend from the root 4 to the undersides of the platform 6 between stages. The blade 5 is shown as commencing immediately from the top of the platform 6. Cooling holes 8 extend lengthwise through the root 4 and blade 5.

Below each seating such as 1a there is an air-receiving cavity 11 in the rim of the disc, extending less than the length of the blade root. Air supply holes or inlets 10 are drilled obliquely through each rim into the adjacent cavity. The ribs 4a may be cut away centrally to form grooves 12 extending from cavity 11 on each side of the root.

Passing through each web 4b and platform 6 are oblique holes 9a into the cavity 11 and, between these, holes 9b into the annular spaces 13 between the flanges and the shrouds formed by platforms 6. Flanges 1b, 2b and 3b are sealed together to seal off the spaces 13 from the spaces between the discs (Figure 1).

Between the rings of rotor blades are rings of stator blades 14, each of which has a running clearance between its tip and the ring formed by platforms 6; each blade 14 has a root 15 seated in well known manner in undercut annular grooves 20a in the stator frame 20. These blades 14, like the rotor blades, have integral platforms 16 which co-operate to form a shroud around the tips of the rotor blades and which, together with the platforms 6, form the boundary walls of the hot gas path through the turbine; there is an annular air space 17 around each shroud, between it and the stator frame 20. Annular cavities 21, 22 and 23 are formed around the stator frame 20 immediately behind the seatings of each ring of stator blades 14. Within each cavity is a sheet metal annular trough 24 having, at its open end, flanges 24a abutting against the backs of the blade roots, and diametrically opposite inlets 24b to admit cooling air which can divide to form four separate streams around quadrants of the troughs to cool the bottom of each blade root 15; some of this air can leak over the roots and seatings into the air space 17, and so through gaps between platforms 16 into the main gas path. Holes 18 right through the blades 14 and holes 19 through platforms 16 allow flow of another part of the air to cool the whole blade. In the annular spaces 17 there are liners 34 which may be of polished sheet metal, spaced apart from the stator frame 20 to form a heat insulating layer of air between the space occupied by the main cooling air and the metal of the stator frame 20. The latter is of course, split diametrically in the usual way.

Extending from disc wheel 1 is hollow rotor shaft 36 supported in bearing 37. Extending in the opposite direction from wheel 3 is rotor shaft 38 supported in bearing 39. Housing 40 for bearing 37 is supported by spider 41 (see Figure 3) having a number of radial hollow oval struts 41a and 41b; these struts are shown in lengthwise section in Figures 1 and 2 and cross-section in Figure 6. Housing 42 for bearing 39 is likewise supported by a spider 43 having radial hollow struts 43a seen in lengthwise section in Figure 1 and cross-section in Figure 7. A passageway 63 is drilled through the housing 42. Through these struts and passageway 63 passes cooling air. The pipes also pass through the struts 44 for supplying lubricant to and draining it from the various bearings. Around each of the struts are two sheet metal envelopes 45 and 46 spaced from each other and from the struts to provide heat-insulating layers of air around the struts. Similarly a polished sheet-metal liner 47 is provided inside each strut, separated from the inner wall of the strut by a narrow air-gap and defining a duct for said cooling air passing through the strut.

An annular sheet metal fairing 48 is secured by a circular flange to bearing housing 40, to enclose the bearing. Sheet metal envelopes 49 and 50 of similar shape surround the fairing 48 to provide heat insulation and are connected respectively to envelopes 45 and 46 around the struts. At the inner end of the bearing, stationary annular enclosure member 51 carried by flanges on the bearing housing 40 has an annular inner part 51a and an outer peripheral part 51b forming a shroud within the first ring of stator blades. This member 51 carries ring 52 supporting envelopes 49 and 50.

At the other end—the driving end—of the turbine the envelopes 45 and 46 are supported by the struts. The housing 42 encloses not only the radial bearing 39 but also the Michell (Kingsbury) or other thrust bearing 53. A stationary annular enclosure member in two parts—54a and 54b—is carried by housing 42 and spider 43. A passageway 61 is drilled through the housing 42 and the enclosure member 54b for passage of cooling air from the interior of the strut 43a.

Each of wheels 1, 2 and 3 has secured on one side thereof one of the rotary annular enclosure members 27, 28 and 29 formed with radially extending pairs of ribs 27a, 28a, 29a projecting towards the face of the wheel to form radial passages for the cooling air. A polished sheet metal lining 35 between but spaced from the enclosure member and the face of each wheel forms a heat-insulating air gap. The ribbed enclosure member 27 on the outside face of wheel 1 has an axially-extending hub portion 27b around the shaft 36 to form with part 51a a labyrinth or similar seal 30 and an axially-extending peripheral portion forming with part 51b another labyrinth or similar seal 31; as seals 30 and 31 extend in substantially the axial direction they will be substantially unaffected by the considerable relative axial movement which may occur here, at a distance from the thrust bearing, due to differences between the thermal expansion of the stator and the rotor. The outer seal 31 is the usual seal between rotor and stator to prevent leakage of the hot working gases. The inner seal 30 however may allow enough cooling air to leak into the space between the stationary and the rotary enclosure member to cool the outer seal 31 (i. e. the hot gas seal).

The ribbed enclosure member 29 on the outside face of wheel 3 likewise co-operates with members 54a and 54b to form labyrinth or similar seals—an outer seal 32 for preventing leakage of the hot working gases and a seal 33 adjacent to the shaft. At this end, adjacent to the thrust bearing 53, the differential expansion will be small and so, in order to save axial space, at least the outer seal 32 can, in accordance with known practice, be of the type extending radially, or nearly so. The enclosure member 29 provides a downstream-facing surface 62 for the rotor transverse to the axis of the rotor. Cooling air is admitted directly to the space between the stationary and rotary enclosure members 54b and 29 through a passageway 61 in the stator. This cooling air serves not only to cool the hot gas seal 32 but also to exert much more axial pressure on the downstream-facing surface 62 of the rotor than the air at the other end of the rotor; thus the preponderance of axial air pressure on the rotor tends to reduce the load on the thrust bearing. The inner seal 33 is between this thrust balancing air and a separate cooling air stream hereinafter described.

Radial bearing 39 and thrust bearing 53 at the output end are mounted on a sleeve 55 axially movable along the shaft 38 by screw adjustment at 56 and extending outward beyond the bearing housing 42; from its outer end the sleeve 55 can be rotated and so axially adjusted along the shaft 38 and then locked in position by splined locking member 57, this axial movement moving the whole rotor relatively to the fixed element of the thrust bearing, to adjust correctly the axial clearance between the parts of the radial seal 32; the axial seals 30 and 31 at the other end of course permit this adjusting movement, just as they permit of relative thermal expansion.

It will be seen that the described construction forms a rotor having its interior partitioned into separate axially-successive chambers bounded in part by enclosure members or partitions 27, 28 and 29; each blade-cooling cavity 11 communicates through hole or inlet 10 with a separate chamber. Paths for cooling air in separate streams—one for each ring of blades—are formed through the struts at both ends, the path of the air being insulated by air-layers, as described. The air streams can pass along the turbine from both ends along ducts whose boundary walls are formed by the various elements over or through which the air streams flow and then radially outwards to the blades along ducts whose boundary walls are formed by the enclosure members 27, 28 and 29 and the linings 35, the latter paths being thereby heat-insulated from the turbine discs 1, 2 and 3.

As indicated in Figure 3, struts 41a and 41b alternate around the spider 41. Figure 1 shows a section through a strut 41a along line I—I and Figure 2 shows a section through a strut 41b along line II—II. Cooling air can be introduced through these in two separate streams, which may be controlled by two separate valves outside the turbine. One stream, which passes down struts 41a (Figure 1) divides into two. A small part leaks through seal 30, passes over the face of member 27 as a heat insulating layer and then cools the hot gas seal 31. The other part passes between shaft 36 and portion 27b thence outwards through the radial and heat-insulated passages formed between the ribs of the member 27 and so through each of the holes 10 to the air-receiving cavities 11 under the blades of the first stage. Some of the air can flow into the grooves 12 whence, dividing right and left, it flows in parallel paths through the clearance spaces between the mating "fir-tree" ribs and grooves of the blade root and the corresponding seating. This air emerges into the space 13 and escapes into the main gas path of the turbine through holes 9b and gaps between the platforms. Other air from cavity 11 flows through holes 9a while further air flows into passages 8 to cool the whole length of the blade. The latter may be cooled by film cooling, "sweat cooling" or any other method. Another stream of air can pass through the other struts 41b (Figure 2) and over the outer end of the bearing within the fairing 48, thence axially through the interior of shaft 36 to the space between wheels 1 and 2. There the air flows through the radial heat-insulated passages formed by the ribs of the member 28 on the wheel 2 and thence to cool the rotor blades of the intermediate stage as already described for those of the first stage.

Two streams can pass through the struts 43a at the driving end, which again are in two groups. One can pass through passageway 62 and through seal 33 into the space between members 29 and 54b to serve as cooling air for seal 32 and thrust-balancing air. The pressure of the air supplied for this may be adjustable by a control valve outside the turbine. The other stream can pass between shaft 38 and member 29, thence outwards through the radial and heat-insulated passages formed between the ribs of this member 29 to cool the blading of the last turbine stage.

Thus each separate stream of blade-cooling air is led along a duct which is heat-insulated in its path through the struts, and through the turbine discs, and should reach the blade roots substantially unheated by the turbine. Air for heat insulation can be admitted between the envelopes 45 and 46 and thence will enter the space between the envelopes 49 and 50; some of the air may escape through openings 46a and 50a at intervals along the walls of 46 and 50 to form a heat-insulating film over the wall between the wall and the hot gases.

I claim:

1. A multi-stage axial-flow gas turbine including a stator, a rotor, a plurality of rings of stator blades on said stator, a plurality of rings of rotor blades around said rotor the interior of which rotor is divided into chambers, with inlets between each ring of rotor blades and a separate one of said chambers for supplying coolant to the blades, partitions in said rotor partly bounding said chambers, boundary walls around said blades defining an annular hot-gas path through said turbine between said rotor and said stator and between adjacent blades, wall means defining a plurality of coolant-supply ducts extending across said hot-gas path, heat-insulating sheathing around said wall means, and boundary walls in said rotor including said partitions defining a separate cooling path from each of said ducts through one of said chambers and in fluid communication with one of said inlets.

2. A turbine according to claim 1 wherein said sheathing consists of two stream-lined sheet-metal envelopes around the duct, spaced from said wall means and from each other to form heat-insulating layers of air around the duct.

3. A turbine according to claim 1 wherein said rotor has a downstream-facing surface transverse to the axis of the rotor at the low pressure end of the turbine and wherein said stator is provided with means defining a passageway fluidly connected with one of said coolant supply ducts and open to said downstream-facing surface to provide a path for coolant from said one of said ducts to said downstream-facing surface.

4. An axial-flow gas turbine, a chambered rotor structure therein, having a rim formed with a ring of blade root seatings, a ring of rotor blades having roots seating in said seatings, an adjacent ring of stator blades, a shroud ring enclosing, with running clearance, the tips of the stator blades, said shroud ring being formed of platforms integral with and projecting axially of the turbine from individual rotor blades with sufficient clearance between the platforms to permit thermal expansion, boundary walls defining passages extending into the interior of said turbine for admitting coolant and further boundary walls in the rotor spaced at least in part from the adjacent turbine rotor structure and defining a flow path for said coolant heat insulated from the rotor structure, the rotor rim being apertured immediately below each blade root seating to form communication between the flow path and the blade seating to admit coolant directly from said flow path into the blade root seating.

5. A turbine according to claim 4 wherein the said platforms are immediately above the rotor rim but spaced therefrom by a narrow annular gap adjacent the blade root seatings, said seatings having passages therethrough communicating with said gap.

6. A multi-stage turbine according to claim 4 having a plurality of said rings of rotor blades and adjacent stator blades, partitions within said rotor structure dividing its interior into a plurality of separate chambers, each said rotor rim being apertured to put each chamber in fluid communication with the blade roots of a separate stage and boundary walls within said turbine spaced at least in part from the adjacent rotor structure defining separate heat-insulated coolant flow paths to each of said chambers.

7. A multi-stage axial-flow gas turbine including a rotor structure, a ring of rotor blades per stage around said rotor, blade roots on said blades supporting the blades within seatings in said rotor partitions within said rotor internally dividing it into an axially successive series of separate chambers, said chambers being in fluid communication with said blade root seatings through apertures in said rotor immediately below said blade roots, and boundary walls within said turbine defining a separate fluid flow path into each of said chambers and through said chambers to said apertures in said rotor, at least parts of the said boundary walls in each chamber being spaced apart from the adjacent turbine rotor structure to heat-insulate the fluid flow over said parts from said structure.

8. A multi-stage axial-flow gas turbine including a stator, a rotor internally divided into chambers, partitions in said rotor partly bounding said chambers, a plurality of rings of stator blades on said stator, a plurality of rings of rotor blades mounted around said rotor, said rotor and stator defining between them a hot-gas path through said turbine, heat-insulating sheathing extending across said hot gas path and wall means defining a plurality of separate coolant-supply ducts each extending across said hot gas path through said sheathing into said turbine rotor, and boundary walls in said rotor including said partitions defining a separate coolant supply path from each of said ducts through one of said chambers to one ring of said rotor blading, at least parts of said boundary walls within said rotor being spaced from the said rotor to heat-insulate at least a part of said coolant supply path from said rotor.

References Cited in the file of this patent

UNITED STATES PATENTS

| | | |
|---|---|---|
| 2,414,551 | Pavlecka et al. | Jan. 21, 1947 |
| 2,414,788 | Altorfer et al. | Jan. 28, 1947 |
| 2,439,447 | Buck et al. | Apr. 13, 1948 |
| 2,488,783 | Stalker | Nov. 22, 1949 |
| 2,575,682 | Price | Nov. 20, 1951 |
| 2,584,899 | McLeod | Feb. 5, 1952 |
| 2,603,453 | Sollinger | July 15, 1952 |
| 2,606,741 | Howard | Aug. 12, 1952 |
| 2,611,532 | Ljungstrom | Sept. 23, 1952 |
| 2,657,901 | McLeod | Nov. 3, 1953 |
| 2,680,001 | Batt | June 1, 1954 |

FOREIGN PATENTS

| | | |
|---|---|---|
| 612,097 | Great Britain | Nov. 8, 1948 |
| 824,013 | France | Oct. 25, 1937 |
| 919,016 | France | Nov. 18, 1946 |